United States Patent [19]
Horikoshi et al.

[11] Patent Number: 5,544,005
[45] Date of Patent: Aug. 6, 1996

[54] KEYBOARD STORAGE APPARATUS HAVING A CABLE END MOVED BY MOVEMENT OF A KEYBOARD HOUSING SECTION

[75] Inventors: Seita Horikoshi, Zama; Mikio Kurihara, Yokohama; Atsuhisa Naitoh, Ebina; Kazuhide Yoshihara, Machida, all of Japan

[73] Assignee: International Business Machines Corporation, Armonk, N.Y.

[21] Appl. No.: 271,828

[22] Filed: Jul. 7, 1994

[30]  Foreign Application Priority Data

Jul. 7, 1993  [JP]  Japan .................................. 5-167644

[51] Int. Cl.⁶ ................................ G06F 1/16; H05K 7/16
[52] U.S. Cl. ........................... 361/680; 400/682; 361/727
[58] Field of Search ......................... 248/918; 364/708.1; 400/682; 312/223.2, 223.3, 223.6; 439/131; 174/69, DIG. 9; 361/680, 725–727, 826, 827

[56]  References Cited

U.S. PATENT DOCUMENTS 5,187,641  2/1993  Muskatello et al. ................ 361/680 X

*Primary Examiner*—Michael W. Phillips
*Attorney, Agent, or Firm*—Keith L. Hargrove

[57]  ABSTRACT

A keyboard housing structure is disclosed that includes a keyboard housing section for housing a keyboard body and a cable housing section for housing a cable. The cable is connected at one end to the keyboard body which is movable in the cable housing section along a housing direction in a pull-out direction. The other end of the cable is moveable in the housing direction within the cable housing section when housing the keyboard body in the keyboard housing section. Further included is a cable side connector, which is provided on the other end of the cable. A storing section side connector is detachably connected to the cable side connector and is housed in the cable housing section in such a manner as to be movable along the housing direction and the pull-out direction. The cable side connector is latched by a latch when the store section side connector is at a predetermined position in the pull-out direction in the cable housing section.

4 Claims, 8 Drawing Sheets

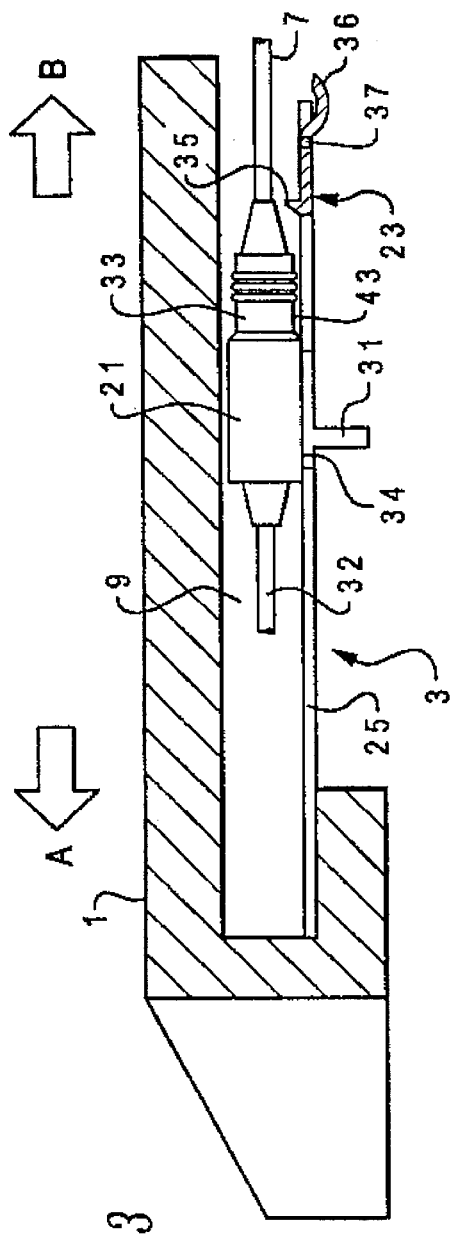
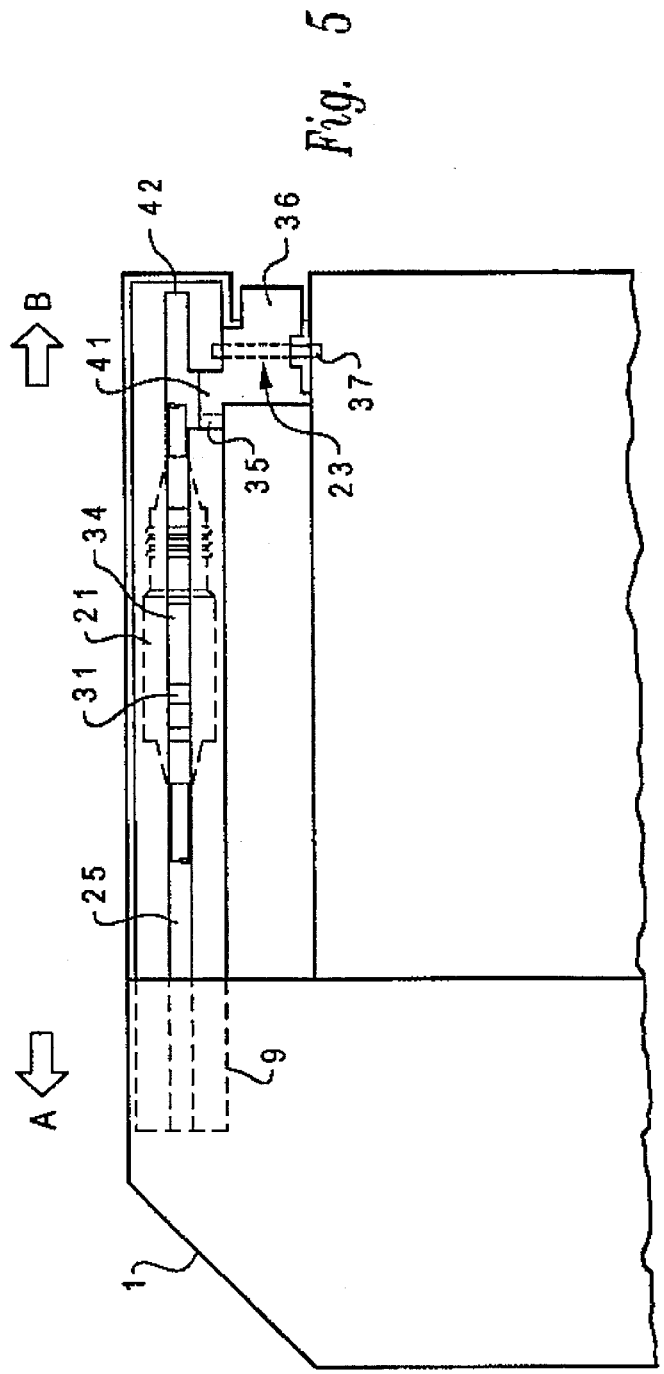

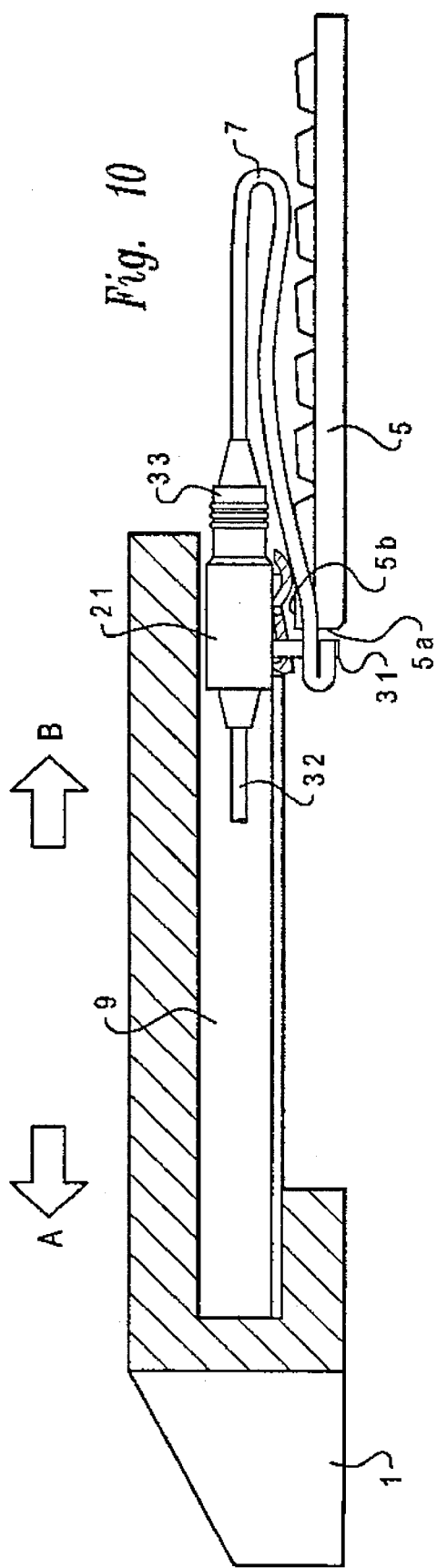
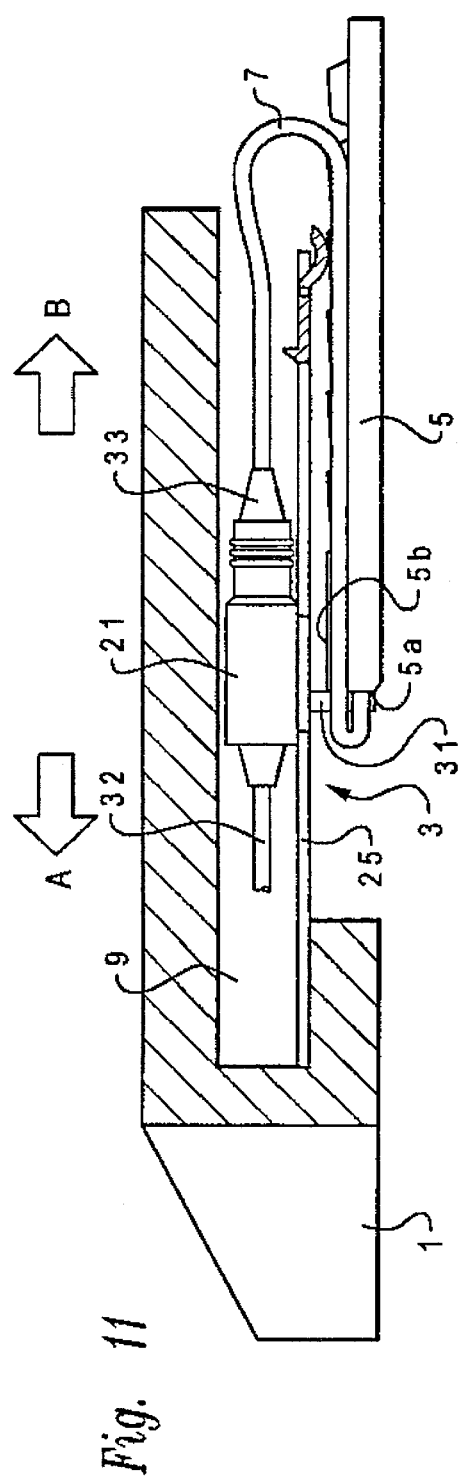

KEYBOARD STORAGE APPARATUS HAVING A CABLE END MOVED BY MOVEMENT OF A KEYBOARD HOUSING SECTION

BACKGROUND OF THE INVENTION

1. Technical Field

This invention relates to a keyboard, and more particularly, to a structure for storing the keyboard when not in use.

2. Description of the Related Art

Today, with the development of various personal computers and word processors (hereinafter called "computers"), there has arisen a need to employ a pen or touch panel as the input device for such computer in place of a keyboard. Input devices such as the pen are useful for drawing graphics or for selecting icons, but their usability is still unsatisfactory when inputting a number of characters at a fast rate. Thus, a keyboard may sometimes be required.

In addition, a base apparatus (also called an extension box or docking station) has been developed to enhance the functions of a computer. A portable computer does not need a keyboard on the base apparatus because the keyboard is incorporated into the computer body. However, in the case of a base apparatus for a computer having only a pen input device, a keyboard is typically required for reasons similar to the above.

Unfortunately, there is considerable difficulty in providing a space for housing the keyboard and its cable in a housing space for a small device such as the portable computer or the base apparatus. In a case where a user wants to ensure a degree of freedom with respect to the location where the keyboard is placed, the cable should exceed a certain length, thus increasing the storage difficulty. In addition, in a case where a winding device is provided to store such long cables simultaneously when the keyboard is stored, the structure becomes too large for where the apparatus is intended to be located.

Prior solutions use an arrangement in which a cable storing section is provided in a keyboard section; these fail to show an arrangement for storing the keyboard and the cable. Another solution uses a structure for storing the keyboard in a drawer of a desk, but also lacks a way for the storing of the cable.

SUMMARY OF THE INVENTION

An object of this invention is to provide a keyboard storing structure that can easily store the cable of the keyboard, and that can be easily constructed with a simple arrangement.

Another object of this invention is to store easily the cable with a simple arrangement, and of to detach the keyboard body from the computer or the line for providing more convenient versatility.

The keyboard storing structure according to this invention comprises a keyboard storing section for storing a keyboard body, and a cable storing section for storing a cable, one end of which is connected to the keyboard body, the other end of the cable being arranged so as to be movable in the cable storing section along a storing direction and a pull-out direction, the other end of the cable being arranged so as to be moved in the storing direction within the cable storing section in conjunction with the action for storing the keyboard body in the keyboard storing section. This allows the cable to be stored at the same time the keyboard body is stored.

The keyboard storing structure according to this invention provides a cable side connector on the other end of the cable, a storing section side connector detachably connected to the cable side connector being stored in the cable storing section movable along the storing direction and the pull-out direction, the cable side connector being arranged so as to be latched by a latch device when the storing section side connector is at a predetermined position in the pull-out direction in the cable storing section. The arrangement allows the cable to be simultaneously stored only by performing the operation for storing the keyboard body, and can be easily connected to, or disconnected from, the cable side connector.

A base apparatus for removably coupling to, and cooperating with, a portable computer, or other like information processing devices, are provided with the above-mentioned keyboard storing structure so that the cable can be simultaneously stored by merely performing the operation for storing the keyboard body, and can be easily connected to or disconnected from the cable side connector.

BRIEF DESCRIPTION OF THE DRAWINGS

FIG. 3 is a cross sectional view along III—III in FIG. 2;

FIG. 5 is a bottom view in the state of FIG. 3;

FIG. 10 is a cross sectional view along III—III when the latch is released;

FIG. 11 is a cross sectional view along III—III showing a state where the keyboard body is further moved in the storing direction A.

DETAILED DESCRIPTION OF PREFERRED EMBODIMENT

An embodiment of this invention will be explained by referring to FIGS. 1 through 12.

Figure 1:
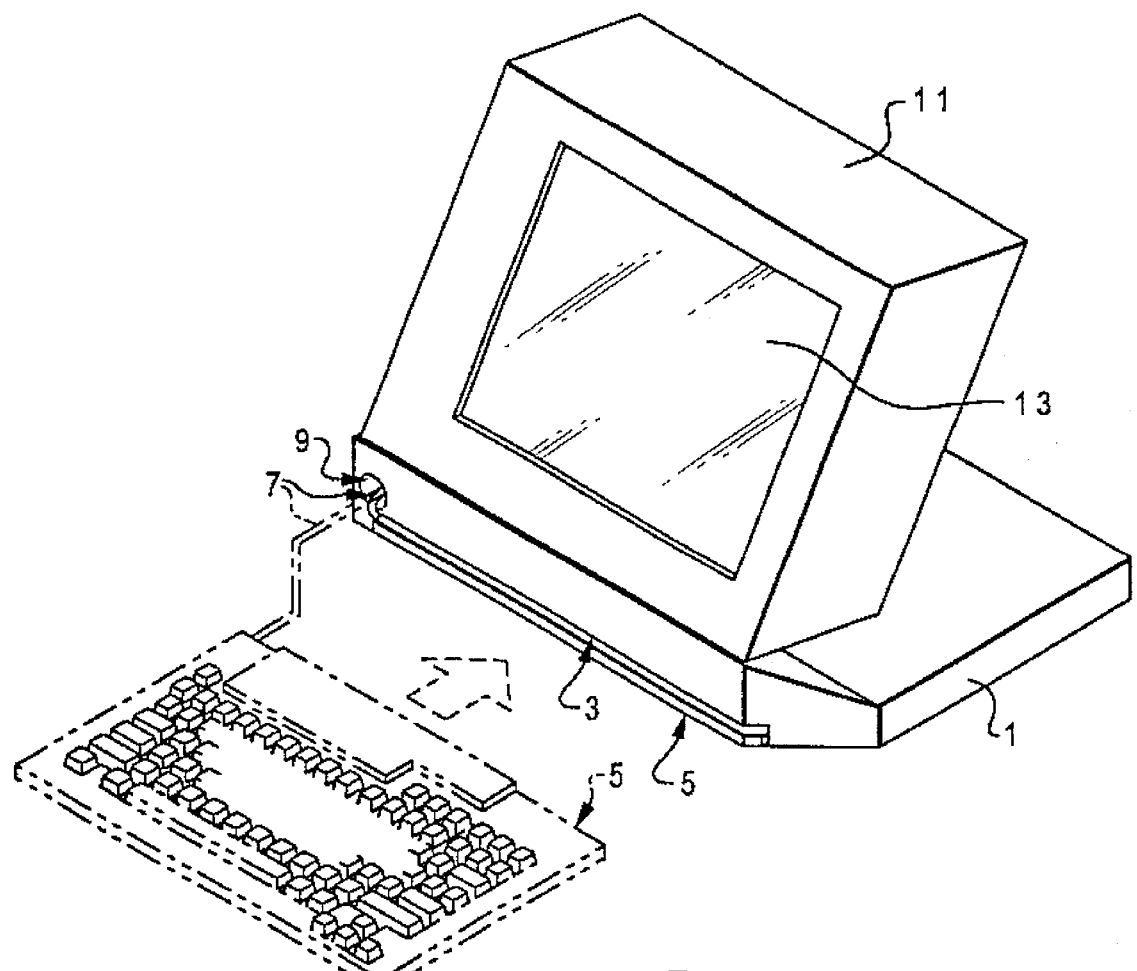
FIG. 1 is a perspective view of a keyboard housing apparatus according to this invention.

FIG. 1 shows an embodiment wherein the keyboard storing structure according to this invention is applied to a base apparatus for a portable computer. A pen input type portable computer 11 has a flat display panel 13, which serves as both a pen input recognition function and a display. The computer 11 is removably connected to the base apparatus 1 for the portable computer. The base apparatus 1 has a keyboard storing section 3 for storing a keyboard body 5 and a cable storing section 9 for storing a cable 7. The base apparatus 1 may enhance the functions of this portable computer 11 by providing an FDD (floppy disk drive), an HDD (hard disk drive), an expansion bus connector, or the like. The pen input type portable computer 11 itself does not have a keyboard. Although the computer 11 is small in size and has limits to its function, its function can be enhanced by connection to the base apparatus 1.

The state where the keyboard body 5 is pulled out from the keyboard storing section 3 is indicated by alternate long and two short dashed lines. When it is so pulled out the user can place the keyboard body 5 at any desired position for input operation because the cable 7 is of a certain length. The keyboard body 5 is designed to be stored in the keyboard storing section 3, but its shape needs not be limited to that illustrated in the figure.

Figure 2:
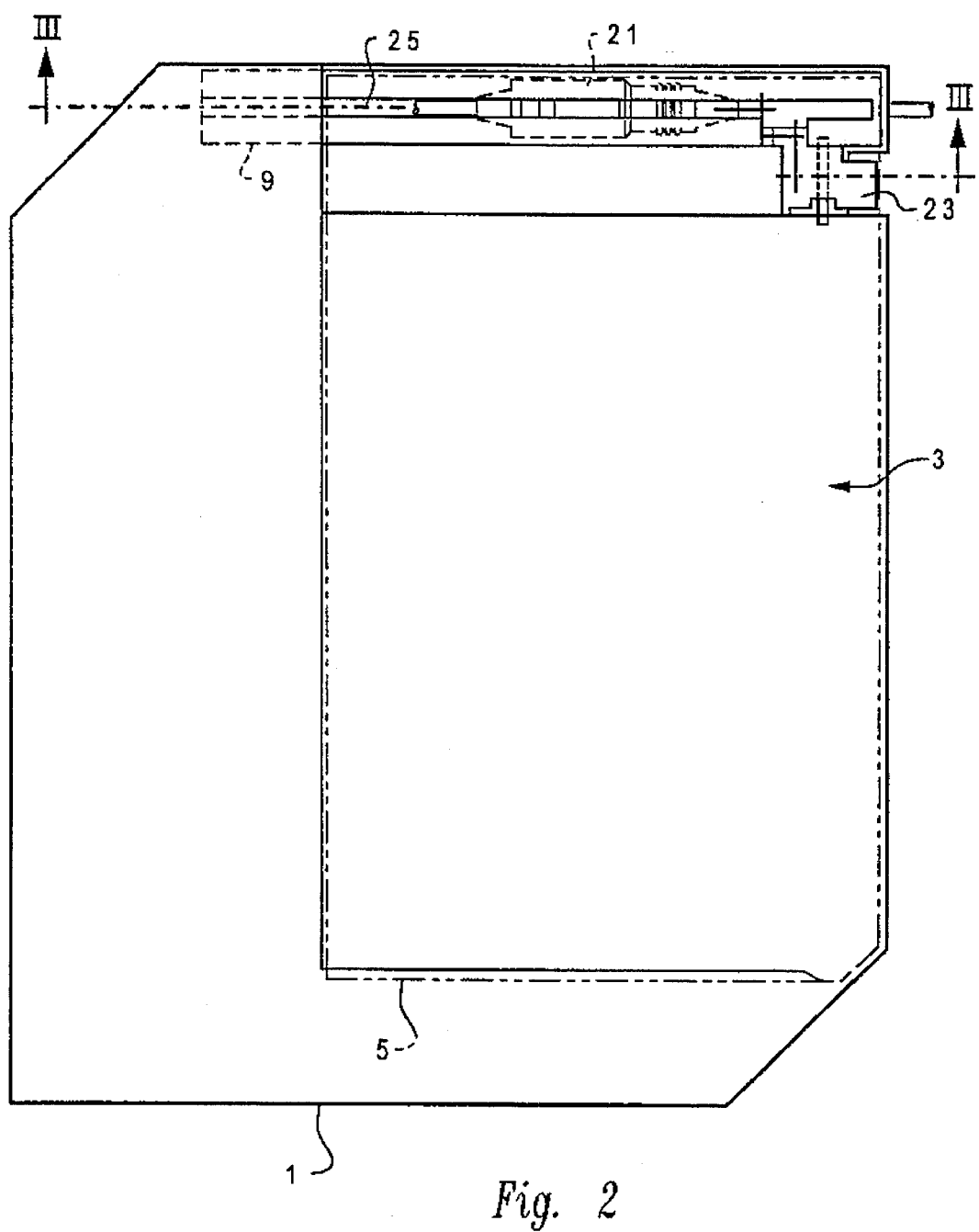
FIG. 2 is a bottom view of a base apparatus having a keyboard storing structure as illustrated in FIG. 1.

FIG. 2 shows the bottom of the base apparatus 1. The bottom of the base apparatus 1 is provided with a keyboard storing section 3. The keyboard body 5 stored in the storing section 3 is exposed on the bottom. However, each side line of the keyboard body 5 is slidably held by a supporting structure, not shown, so as not to drop from the storing section 3. The cable storing section 9 is at a position adjacent to the keyboard storing section 3. The cable storing section 9 is provided with a rail 25 therein. This rail 25 is formed by opening the peripheral wall of the cable storing section 9 in a narrow width along the longitudinal direction of the cable storing section 9. The rail 25 movably guides an interlocking member 21 in the cable storing section 9. The interlocking member 21 moves along the rail 25 in interlocking with the insertion and pull-out operation of the keyboard body 5 as will be described in detail later. The interlocking member 21 is latched by a latch device 23 when it is pulled out to the end of the pull-out direction of the cable storing section 9. The arrangement of this keyboard storing structure will be explained by referring to the sectional view taken along III—III in FIG. 2 (FIG. 3), the bottom view (FIG. 5), and the enlarged view of the interlock member 21 (FIG. 4).

FIG. 3 shows III—III section of FIG. 2 in an enlarged scale. The base apparatus 1 provided with the keyboard storing section 3 on its bottom, and the cable storing section 9 over the keyboard storing section 3. A base apparatus side cable 32 is fixed at the side in the storing direction A of the interlocking member 21. This cable 32 is for transmitting signals from the keyboard 5 to an electronic circuit (not shown) within the base apparatus 1. This base apparatus side cable 32 has sufficient length to allow free movement of the interlocking member 21 in a predetermined range within the cable storing section 9. Provided at the end of pull-out direction B of the interlocking member 21 is a storing section side connector (not shown) 43 allowing connection with a cable side connector 33. The cable side connector 33 and the storing section side connector 43 may be of any conventional shape. The cable side connector 33 is removably connected to the end of the interlocking member 21 in the pull-out direction B through the storing side connector 43. As described later, the interlocking member 21 is latched or temporarily fixed on the base apparatus 1 at a predetermined position within the cable storing section 9 close to B in the pull-out direction so as to facilitate connection and disconnection of the cable side connector 33 to and from the interlocking member 21.

Figure 4:
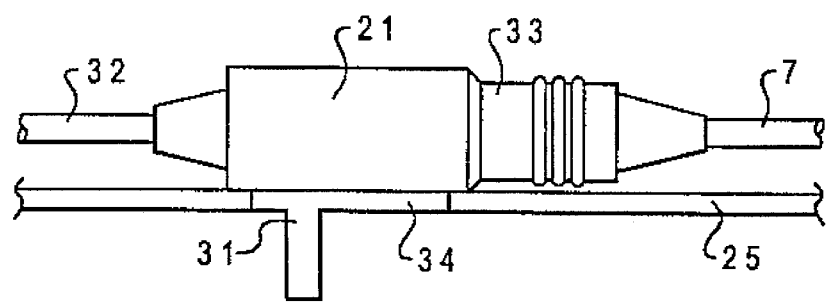
FIG. 4 is an enlarged view of an interlocking member 21.

FIG. 4 shows the interlocking member 21 in an enlarged scale. In the figure, a rail interlock section 34 is provided below the interlocking member 21. The rail interlock section 34 is movably inserted in the rail 25, while the interlocking member 21 is movably guided by the rail 25 through the rail interlock section 34. An interlock arm 31 is projected from the rail interlock section 34. The end of the rail interlock section 34 in the pull-out direction B is arranged so as to abut against the end 42 of the rail 25 (FIG. 5) when interlocking member 21 is moved to the predetermined position within the cable storing section 9 in the pull-out direction B. This is for preventing the interlocking member 21 from further movement in the pull-out direction B.

The interlock arm 31 is for causing the interlocking member 21 to move in the storing direction A by engaging with the keyboard body 5 when the keyboard body 5 is stored in the storing section 3. The interlocking operation between the keyboard body 5 and the interlocking member 21 will be described later in detail.

Referring to FIG. 3 again, the interlocking member 21 is arranged so as to be latched on the base apparatus 1 by the latch device 23 when the interlocking member 21 is at a predetermined position in the cable storing section 9 in the pull-out direction B. This latch device 23 is mounted on the base apparatus 1 by a rocking shaft 37 which allows the latch device 23 to rock. A latch claw 35 is upwardly projected at the end of the latch device 23 in the storing direction A. In addition, the latch device 23 is energized by a spring (not shown) or the like so that it is rocked to the direction where the latch claw 35 rises. When the interlocking member 21 moves to a predetermined position in the cable storing section 9 in the pull-out direction B, the latch claw 35 abuts against the end surface of the interlocking member 32 in the storing direction A so as to prevent the movement of the interlocking member 21 in the storing direction A. Moreover, a keyboard receiver 36 is provided on the end of the latch device opposite to the latch claw 35. When the keyboard body 5 is stored, it is necessary to move the latch claw 35 downward to release the latch on the interlocking member 21 with the latch claw 35 so that, when the front end of the keyboard body 5 abuts against the keyboard receiver 36, the keyboard receiver 36 is arranged so as to be moved upward. That is, when the keyboard body 5 is horizontally inserted into the keyboard storing section 3, the front end of the keyboard body 5 abuts against the keyboard receiver 36 so as to push up the keyboard receiver 36 so that the latch claw 35 is pushed down.

FIG. 5 shows the bottom view of essential parts of FIG. 3. The latch device 23 is provided near the end of the cable storing section 9 in the pull-out direction B. The latch claw 35 is provided at the front end of the rocking arm 41. The slot 25 is a narrow and long opening, and defines the range of movement of the rail interlock section 34, or the range of movement of the interlocking member 21. In the state where the latch claw 35 latched the end of the-interlocking member 21 in the storing direction A, the interlocking member 21 is held between the end 42 of slot 25 and the latch claw 35 so that the interlocking is prevented from sliding.

Figure 6:
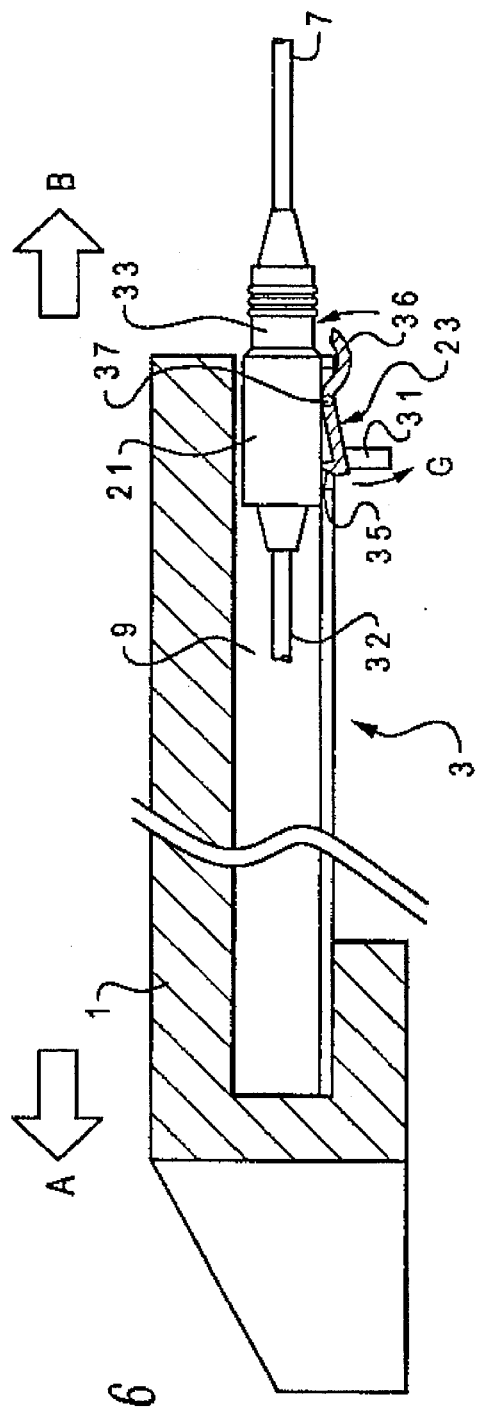
FIG. 6 is a cross sectional view along II—II when the interlocking member of FIG. 3 moves in the pull-out direction B.

FIG. 6 shows a state where the cable 7 and the interlocking member 21 are pulled out in the pull-out direction B from the state shown in FIG. 3. When the keyboard body 5 is further separated from the base apparatus 1 after it is pulled out from the keyboard storing section 3, the cable 7 is also pulled out from the cable storing section 9. The interlocking member 21 moving in the pull-out direction B rides on the latch claw 35. The interlocking member 21 is limited in its upward movement by the upper wall of the cable storing section 9 so that the entire latch claw 35 is rocked in the direction G (counterclockwise). In this case, the keyboard receiver 36 is not placed in a position preventing the movement of the interlocking member 21 (particularly, the slot interlock section 34) in the pull-out direction B even if the latch claw 35 is pushed down, and the keyboard receiver 36 is pushed up (see FIG. 4).

Figure 7:
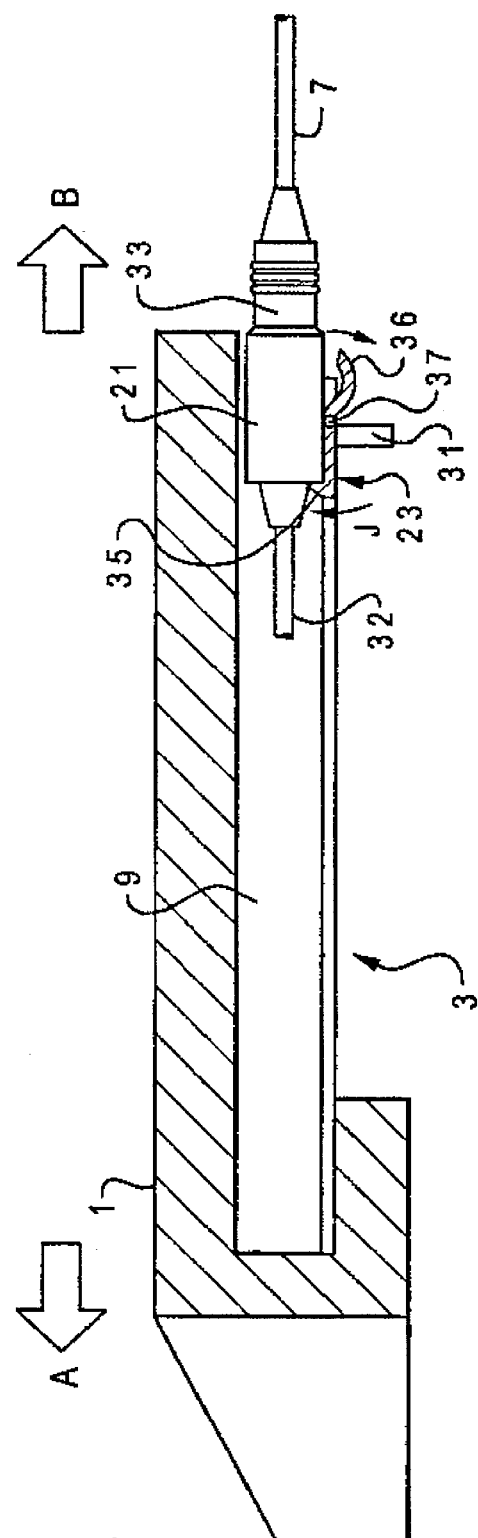
FIG. 7 is a cross sectional view along II—II in a state where the interlocking member of FIG. 4 is further pulled-out in the pull-out direction B and latched by a latch device.

FIG. 7 shows a state where the interlocking member 21 is further pulled out from the state of FIG. 6. If the end of the interlocking member 21 in the storing direction A rides over the front end of the latch claw 35, the latch claw 35 rocks in the direction J (clockwise) under the energization force of the spring (not shown), and abuts against the end face of the interlocking member 21 in the storing direction A so as to prevent the movement of the interlocking member 21 in the storing direction A. In addition, the movement in the pull-out direction B is prevented by the end 42 of the rail 25. That is, the interlocking member 21 is latched on the base apparatus 1 at a predetermined position at the end of opening of the cable storing section 9.

Figure 8:
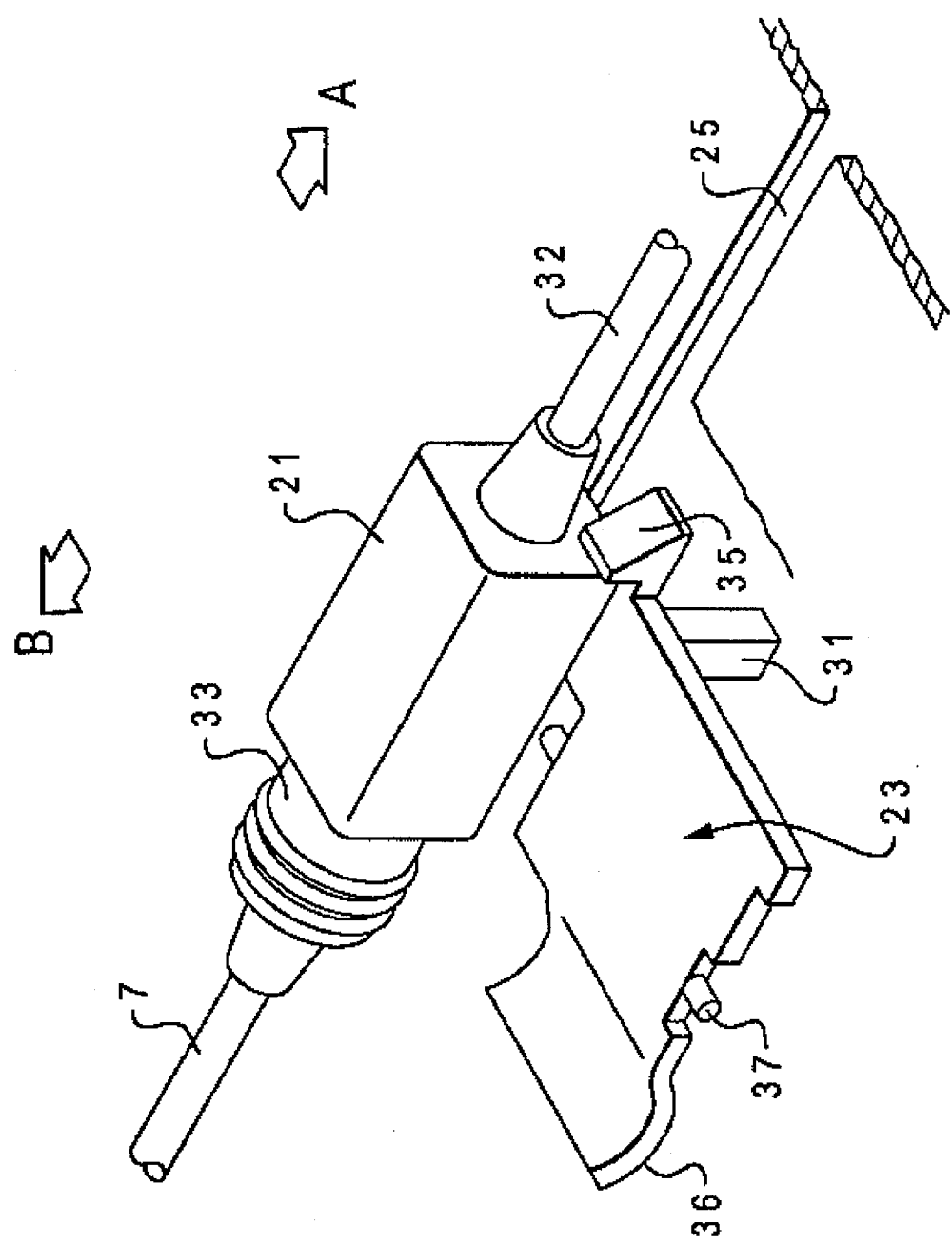
FIG. 8 is a perspective view of FIG. 6.

Furthermore, FIG. 8 shows a perspective view in the above-mentioned latched state. In a case where the interlocking member 21 has a rectangular parallelopiped shape, stability is increased when it moves within-the cable storing section 9 so that it is easy to ensure latching of the interlocking member 21 by the latch claw 35 of the latch device 23.

Figure 9:
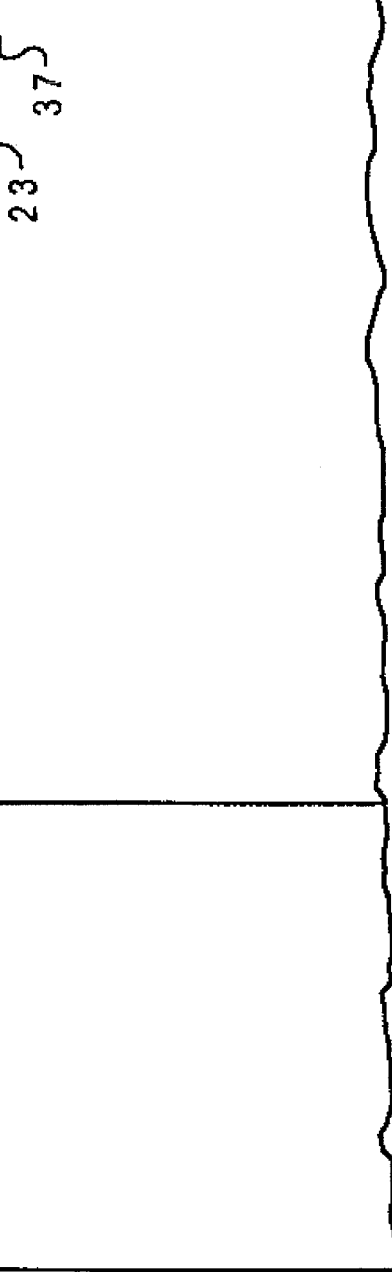
FIG. 9 is a bottom view in a state of FIG. 6.

FIG. 9 shows the bottom view of essential parts of FIG. 6. The latch claw 35 latches the end face of the interlocking member 21 in the storing direction A. In the latched state, it is easy to connect and disconnect the cable side connector 33 to and from the interlocking member 21. However, in a state where tine latch claw 35 does not latch the interlocking member 21, the interlocking member 21 is moved as it is intended to connect or disconnect the cable side connector 33 to or from the interlocking member 21, which makes the connection and disconnection operation difficult.

Next, the operation for storing the keyboard body 5 in the keyboard storing section 3 will be described. FIG. 10 shows a state where the interlocking member 21 is released from the latch device 23. When it is intended to store the keyboard body 5 into the keyboard storing section 3, the upper surface 5b of the front end of the keyboard body 5 abuts against the keyboard receiver 36 from the bottom so as to push up the keyboard receiver 36. The latch claw 35 at the other end of the keyboard receiver 36 is pushed down to release the interlocking member 21 from the latch claw 35.

FIG. 11 shows a state where the keyboard body 5 is further inserted into the storing section 3 after the interlocking member 21 is released from the latch claw 35. The front end 5b of the keyboard body 5 abuts against the interlock arm 31 to pressingly move the interlock arm 31 toward the storing direction A. The interlocking member 21 also moves to the storing direction A together with the interlock arm 31. Because the end of the cable side connector 33 on the cable 7 is connected to the interlocking member 21, the cable 7 is stored in the cable storing section 9 as the interlocking member 21 is moved.

Figure 12:
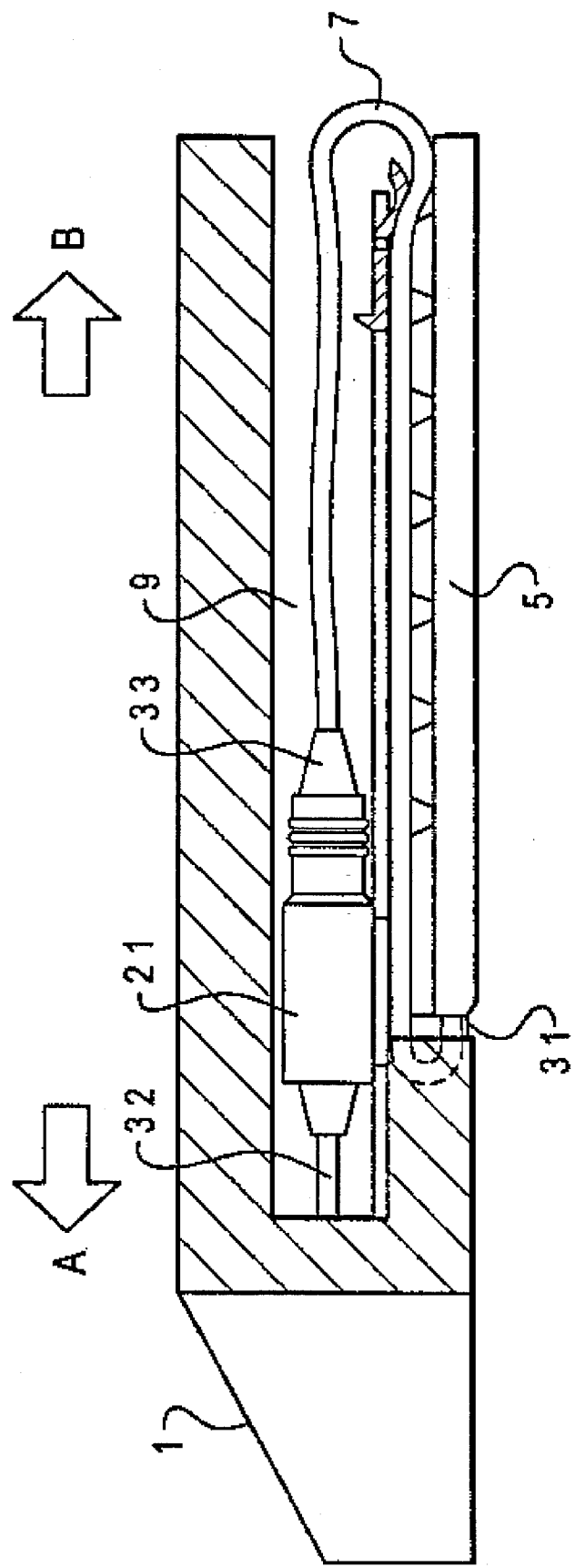
FIG. 12 is a cross sectional view along III—III when the keyboard body is completely stored.

FIG. 12 shows a state where the keyboard body 5 is further inserted in the storing direction A, and the keyboard body 5 is completely stored in the keyboard storing section 3. The interlock arm 31 is positioned at the end of the keyboard storing section 3 in the storing direction A, and the interlocking member 21 with this interlock arm 31 is also stored at the end of cable storing section 9 in the storing direction A. The cable 7 is bent across both the cable storing section 9 and the keyboard storing section 3, and stored therein. Therefore, the cable 7, with a length about twice that of the horizontal length of the keyboard storing section 3, can be stored in the storing sections 9 and 3.

When it is wanted to reuse the keyboard body 5 after the keyboard body 5 and the cable 7 are completely stored as shown in FIG. 12, the keyboard body 5 is pulled out from the keyboard storing section 3. If the keyboard body 5 is separated from the base apparatus 1 after the keyboard body 5 is pulled out, the interlocking member 21 is pulled and moved by the cable 7 (see FIG. 3).

As described above, this embodiment has an advantage in that the cable can be stored in interlocking with the storing operation of the keyboard body.

In addition, as the usability for the user is taken particularly into consideration, the cable side connector 33 can be removed in front of the base apparatus 1. Then, it is arranged so as to be able to avoid a configuration in which the cable side connector 33 projects outward from the base apparatus 1 when the keyboard body 5 is stored, and to provide an aesthetically pleasing appearance as well as portability for the entire base apparatus 1 by storing the interlocking member 21 during the storing operation of the keyboard body 5.

The application of this invention is not limited to the above embodiment. For example, although the above embodiment is arranged in such a manner that the interlocking member 21 is pressed by the keyboard body 5 through the interlock arm 31 to move within the cable storing section 9, it may be possible to provide such an arrangement that, once the interlocking member 21 is released from the latched state, it is pulled and moved in the cable storing section 9 by a pulling device utilizing a spring or the like without pressing by the keyboard body 5. Moreover, it may be possible to provide an arrangement such that the interlocking member detects the storing operation of the keyboard body 5 and moves by itself with such an operation.

Although, in the above embodiment, the latch claw 35 latches the end surface of the interlocking member 21 in the storing direction A, it may be arranged so that the latch device holds the entire interlocking member 21, or so that it bites into a part of the interlocking member 21. In addition, the latched state may be released by a part other than the front end of the keyboard body 5 (for example, by providing a special engaging device) rather than abutment of the front end of the keyboard body 5, or by operating a release button which in not engaged with the keyboard body 5. Furthermore, the position of the keyboard storing section 3 or the cable storing section 9, the shape of the interlocking member 21 or the latch device, or the arrangement of the cable 32 or the rail 25 is not limited to those of the above embodiment.

Furthermore, although in the above embodiment the keyboard storing structure, according to this invention, is provided on a pen input type portable computer, this invention is not limited to this embodiment, but may be provided, according to this invention, on a base apparatus body for a portable computer of a type in which entry is made by a keyboard. Alternatively, the keyboard storing structure may be provided for a portable computer body of a pen input type or a type in which entry is made by a keyboard according to this invention, or a non-portable computer body.

As described above, according to this invention, there are advantages that the cable can be stored in interlocking with the storing operation of the keyboard body, and that an aesthetically pleasing appearance and portability can be provided. In addition, there are also advantages in that the cable for the keyboard can be easily stored, in that a simple arrangement can be provided, and in that an easy-to-use keyboard storing structure can be provided. Furthermore, there are advantages in that the cable can be easily stored with a simple structure and in that the keyboard body can be separated from the computer or the like for providing a more versatile use environment.

We claim:

1. A keyboard housing structure comprising:

a keyboard housing section for housing a keyboard body;

a cable housing section for housing a cable having one end connected to the keyboard body, and a second end of the cable being arranged to be movable in the cable housing section along a housing direction and a pull-out direction, said second end of the cable being arranged to be moved in the housing direction within said cable housing section when moving said keyboard housing section in the housing direction;

a cable side connector is provided on said other end of the cable; and a storing section side connector detachably connected to said cable side connector being housed in said cable housing section movable along said housing direction and said pull-out direction, said cable side connector being arranged so as to be latched by a latch means when said storing section side connector is at a predetermined position in said pull-out direction in the cable housing section.

2. A keyboard housing structure as set forth in claim 1 further comprising a base device for a portable computer detachably connected to a portable computer for cooperation with said portable computer.

3. A keyboard housing structure as set forth in claim 1, further comprising an information processing system coupled to said keyboard housing section.

4. A keyboard housing structure comprising:

a keyboard housing section for housing a keyboard body;

a cable housing section for housing a cable having one end connected to the keyboard body and a second end being arranged to be moveable in the keyboard housing section along a housing direction and a pull-out direction, said second end of said cable being arranged to be moved in the housing direction within said cable housing section by inserting the keyboard body into said keyboard housing section;

a cable side connector, coupled to said second end of said cable for detachably connecting said cable within said cable housing section; and a cable connector latch for latching said cable side connector when positioned at a predetermined point in said pull-out direction in said cable housing section.

* * * * *